United States Patent
Anderson et al.

(10) Patent No.: US 7,350,068 B2
(45) Date of Patent: Mar. 25, 2008

(54) SERVER BLADE NETWORK BOOT METHOD THAT MINIMIZES REQUIRED NETWORK BANDWIDTH

(75) Inventors: Jeffrey Wayne Anderson, Fayetteville, NC (US); Simon Chu, Chapel Hill, NC (US); Richard Alan Dayan, Raleigh, NC (US); Peter Thomas Donovan, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 11/112,132

(22) Filed: Apr. 22, 2005

(65) Prior Publication Data

US 2006/0242400 A1 Oct. 26, 2006

(51) Int. Cl.
*G06F 15/177* (2006.01)
*G06F 15/16* (2006.01)
(52) U.S. Cl. ............... 713/2; 719/219; 719/220
(58) Field of Classification Search ............ 713/1, 713/2; 719/325–327; 709/219, 220
See application file for complete search history.

(56) References Cited

U.S. PATENT DOCUMENTS

| 6,272,629 | B1 | 8/2001 | Stewart |
| 7,013,385 | B2 * | 3/2006 | Abbondanzio et al. ........ 713/2 |
| 7,194,619 | B2 * | 3/2007 | Abbondanzio et al. ..... 713/155 |
| 2003/0097487 | A1 * | 5/2003 | Rietze et al. ............... 709/325 |
| 2003/0188176 | A1 | 10/2003 | Abbondanzio et al. |
| 2003/0226004 | A1 * | 12/2003 | Abbondanzio et al. ........ 713/1 |
| 2004/0081104 | A1 | 4/2004 | Pan et al. |

FOREIGN PATENT DOCUMENTS

EP 1376932 1/2004

OTHER PUBLICATIONS

Automatically configuring a server blade environment using positional deployment; IBM Research Disclosure, Oct. 2001.

* cited by examiner

*Primary Examiner*—Suresh K Suryawanshi
(74) *Attorney, Agent, or Firm*—Martin McKinley, Esq.; Steven M. Greenberg, Esq.; Carey Rodriguez Greenberg & Paul LLP

(57) ABSTRACT

A system remotely boots a plurality of server blades in a blade center to update each blade. A temporary network is created to provide an out-of-band communication channel between a management module and the plurality of server blades. The management module receives and saves the original boot sequence for each server blade and alters each boot sequence such that each server blade begins with a network boot. After receiving an initial transmission over the network containing server blade boot instructions and storing the boot instructions in a temporary boot server, subsequent server blade boot requests from the network are intercepted and the stored boot instructions are re-routed from the temporary boot server to each of the remaining blades in the blade server thus removing the need for repeated boot packet transmission over the network.

20 Claims, 4 Drawing Sheets

SERVER BLADE NETWORK BOOT METHOD THAT MINIMIZES REQUIRED NETWORK BANDWIDTH

BACKGROUND OF THE INVENTION

1. Statement of the Technical Field

The present invention relates to server blade networks and more particularly to a method and system for updating each blade in a server blade network without the need for an administrator to access each blade via a separate user identification number and corresponding password.

2. Description of the Related Art

In recent years, server architecture has undergone drastic changes. The shape of servers deployed in large data centers has changed significantly toward smaller, more compact systems. There is now a great demand for highly compacted rack mountable servers that cost less money, take up less space, simplify deployment, and consume less power. Distributed server architecture based on "blades" is rapidly emerging as the architecture of choice for Internet service providers and corporate data centers.

Server blade networks stack many independent lower-end servers within a single chassis. Chassis can include as many as 14 "blades". Each blade acts as an independent system with its own memory, processor and network connection. Due to their compact size, many server blades can be placed in a single server chassis, allowing many systems to share HVAC resources and electricity. Due to their relatively small size, server blades consume less power and generate less heat than a typical server. Designing server blades without PC-interfaces for floppy, CD-ROM, keyboard, mouse, printer, SCSI devices, graphics and PCI slots can create affordable server blade systems. Reliability can be increased since server blades typically contain only a bare minimum of electronics. Finally, server blades are easy to deploy as they plug into a pre-wired chassis, are loaded with pre-configured software images and are hot-pluggable.

Typically, due to size and space constraints, there may be a desire to boot one or more server blades remotely. Typically, each server blade within the chassis can be booted or the operating systems can be sent upgrade packages via typical FTP (File Transfer Protocol) or standard Telnet methods. For example, to update a Linux blade, an update package is transmitted to the target blade via FTP. A Telnet system is then used to remotely login to the system and issue an update command to the target blade. However, security restrictions require the network administrator to first receive and then store user identification numbers ("USERIDs") and corresponding passwords for each blade prior to issuing the update commands via the combination of FTP and Telnet transmissions.

As a result of the above-described shortcomings, the network administrator must memorize and/or enter multiple USERIDs and corresponding passwords for each server blade and access the network numerous times, a tedious, time consuming, and costly task. In addition, a great deal of bandwidth is used because each server blade boot request results in a separate transmission of boot packets for each blade over an already burdened IP network. It is therefore desirable to have a server blade network system and method that seamlessly updates each blade in the network via an out-of-band communication path thus obviating the need for a network administrator to enter user identification information for each server blade update transmission and reducing the burden on the IP network.

SUMMARY OF THE INVENTION

The present invention addresses the deficiencies of the art with respect to remote server blade booting and upgrade techniques and provides a novel and non-obvious system and method for remotely booting server blades within a BLADECENTER® while minimizing the use of network bandwidth. In this regard, the system provides a management module that diverts repeated server blade boot requests from an IP network to the local area network. A temporary boot server is created which, after creating a boot image, stores server blade boot and upgrade instructions and, under the control of the management module, transmits the boot and upgrade instructions to each server blade thus allowing for each blade to be booted over the local network rather than the IP network.

According to one aspect, the present invention provides a system for remotely booting a plurality of server blades in a first computer network. The system includes a management module adapted to receive server blade boot packets via the first computer network. The management module is in communication with the one or more server blades within a second computer network. A temporary boot server, adapted to store the boot packets, is coupled to the management module and the one or more server blades within the second computer network. The management module controls transmission of the boot packets from the temporary boot server to the plurality of server blades via the second computer network.

According to another aspect, the present invention provides a method for remotely booting a plurality of server blades in a first computer network. The method includes establishing a second computer network between a management module and the plurality of server blades, altering the boot sequence for each server blade such that each server blade begins with a network boot, creating a temporary boot server to store boot packets, and, upon a server blade request for a boot packet, transmitting the boot packets from the temporary boot server to each of the plurality of server blades within the second computer network.

According to still another aspect, a machine readable storage device having stored thereon a computer program for remotely booting a plurality of server blades in a first computer network is provided. The computer program includes a set of instructions which when executed by a machine causes the machine to perform a method in which a second computer network is established between a management module and the plurality of server blades. The boot sequence for each server blade is then altered such that each server blade begins with a network boot. A temporary boot server is created to store boot packets. Upon a server blade request for a boot packet, the boot packets are transmitted from the temporary boot server to each of the plurality of server blades within the second computer network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention advantageously provides a method and system for remotely booting each of a plurality of server blades within a BLADECENTER® and for providing update packets to each server blade via an out-of-band communication systems in order to minimize bandwidth in a communication network. The invention eliminates the need for repeated administrative intervention and allows each blade within the BLADECENTER® to access a remotely-stored boot image and upgrade package from a remote source via a management module. In this fashion, the present invention implements a separate communication path from a temporary boot server to each server blade, via the management module, allowing all updates to be performed seamlessly without tying up network bandwidth.

Figure 1:
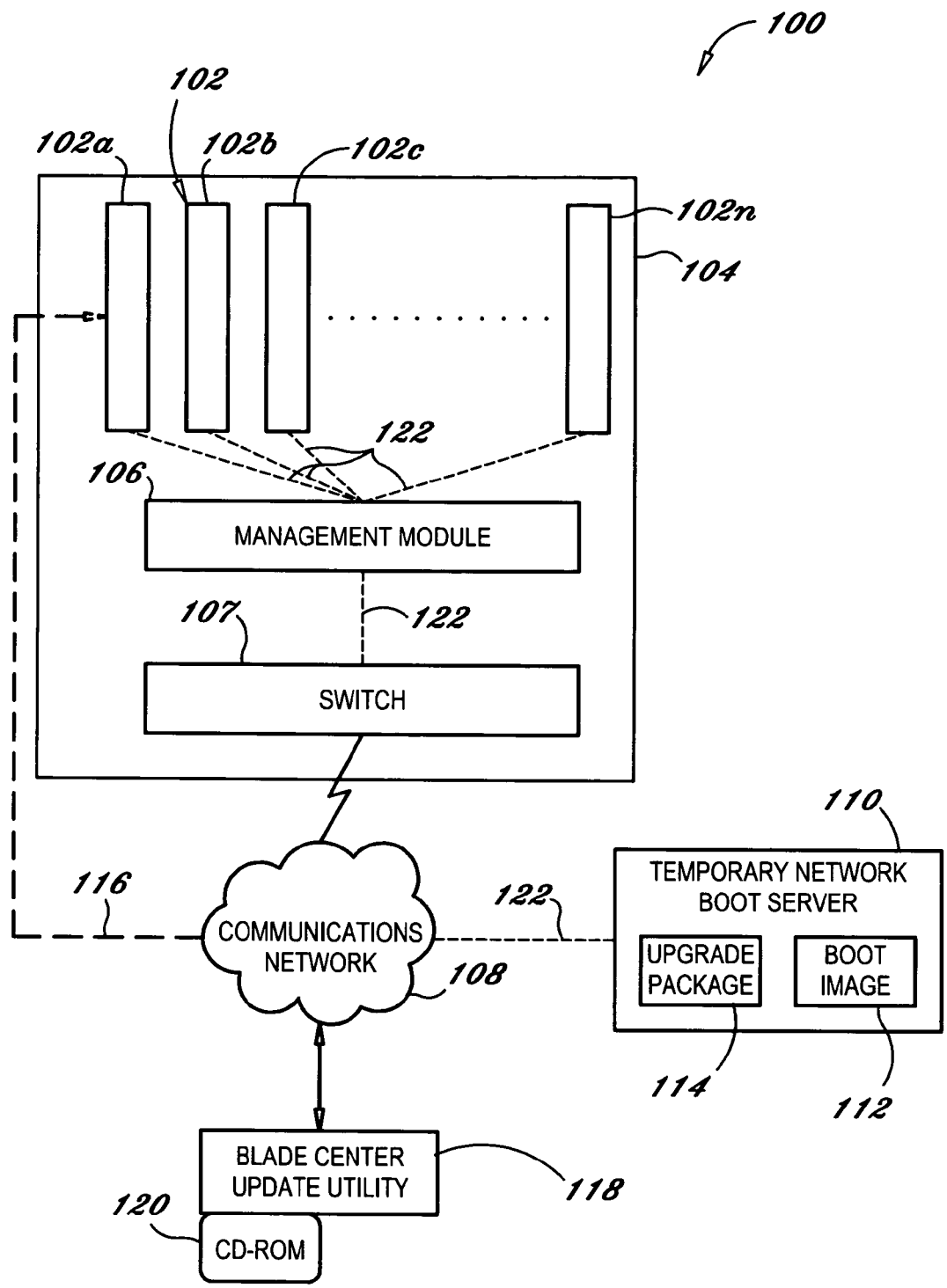
FIG. 1 is a diagram of an exemplary system constructed in accordance with the principles of the present invention.

Referring now to the drawing figures in which like reference designators refer to like elements there is shown in FIG. 1 a system constructed in accordance with the principles of the present invention and designated generally as "100". System 100 includes a plurality of server blades 102a, 102b, 102c through 102n, collectively referred to as "BLADECENTER®" 102. The plurality of server blades are contained within a chassis 104.

A switch 107 may be activated to create a Virtual Local Area Network (VLAN) indicated by the dashed lines designated as 122 in FIG. 1, such that management module 106 is in communication with each of the server blades of BLADECENTER® 102. Switch 107 may reside anywhere inside of chassis 104 and is communication with network 108. Activation, either remotely or directly, of switch 107 enables VLAN 122. Predetermined IP addresses can be designated such that this second, out-of-network communication channel between module 106 and BLADECENTER® 102 and local only to chassis 104, is created. Although management module 106 is preferably situated within chassis 104, it need not be and may be physically situated at a remote location provided it is in communication with BLADECENTER® 102 via VLAN 122. Chassis 104 may contain any number of server blades and the present invention is not limited by the number of server blades contained within chassis 104.

Each of the server blades of BLADECENTER® 102 typically include a central processing unit, an operating system, volatile and/or non-volatile memory and interface hardware and software needed to allow the blades to communicate with management module 106 via VLAN 122.

There is often a desire to remotely boot the server blades, in which case a temporary network boot server 110 containing a boot image 112 can remotely boot the server blades of BLADECENTER® 102.

Management module 106 includes the hardware and software necessary to allow temporary boot server 110 to communicate with the server blades of BLADECENTER® 102, to control communication functions such as the passage of information between server 110 and one or more of the server blades and to perform other functions described herein. Module 106 can include a central processing unit, input/output interfaces, volatile and non-volatile memory, network interfaces and any other hardware as may be known in the art to control the operation of the server blades of BLADECENTER® 102. It is within the scope of the invention to network a plurality of management modules 106 together to operate in connection with both VLAN 122 and network 108.

Continuing to refer to FIG. 1, management module 106 is connected to a blade center update utility 118 via a communications network 108. Communication network 108 can be any network capable of transporting information from utility 118 to management module 106. Examples of communication network 108 include Internet Protocol (IP) networks such as the Internet, a campus LAN, and a telephone network. However, for the sake of simplicity, communication network 108 is referred to herein in the context of an IP network.

Update utility 118 includes a server blade CD-ROM image 120 containing a boot image and a system upgrade package. The boot image and upgrade package are transmitted over communications network 108 to module 106 upon a request by one of the server blades in BLADECENTER® 102. Management module 106 creates temporary network boot server 110 in order to store the boot image 112 and upgrade package 114 received over network 108 thus providing a temporary boot source for the blade servers of BLADECENTER® 102. In an alternate embodiment, server 110 need not be created, and module 106 can direct the blades into a CD-ROM image 120 that resides in module 106. Alternately, a server that houses utility 118 can be used to support the server function.

Server 110 is a software server that can physically reside within any hardware server within the VLAN 122, including module 106. Server 110 contains an operating system and boot image 112 for booting server blades in BLADECENTER® 102 and an upgrade package 114 for performing server updates on the server blades. Server 110 is in communication with module 106 via VLAN 122. Advantageously, the present invention creates a temporary server that can provide boot instructions as well as system updates for each server blade 102 by storing the boot image and upgrade package, and transmitting each to the server blades upon request via an out-of-band network (i.e., via VLAN 122). Thus, boot and upgrade information need not be repeatedly transmitted from utility 118 through network 108 for each server blade (as shown by path 116), which would result in a needless waste of network bandwidth and require constant administrator intervention and supervision. Instead, boot and upgrade packets are transmitted via VLAN 122.

Figure 2:
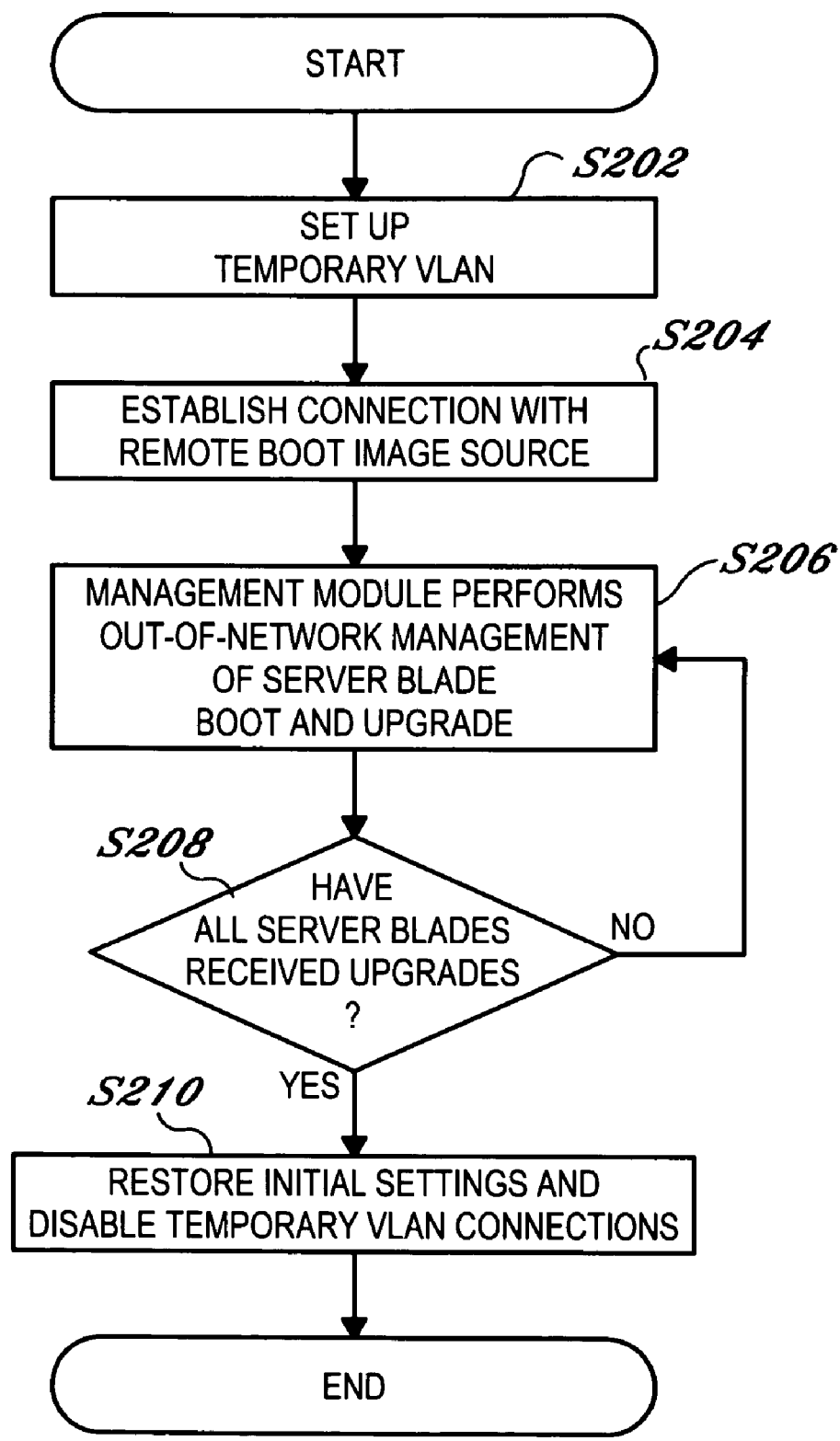
FIG. 2 is a flow chart of the overall process of the present invention.

FIG. 2 shows a flowchart of the overall process of the present invention. First, via step S202, a temporary VLAN 122 is created to ensure communication between module 106 and each server blade within BLADECENTER® 102. By establishing a temporary VLAN 122, an out-of-band network, i.e. a network separate from communication network 108, can be created in order to avoid the sending of boot routines and upgrade information repeatedly over IP network 108. Step S204 establishes a connection between the server blades of BLADECENTER® 102 and a remote boot image source. A temporary remote boot image server 110 is created such that each server blade may be booted remotely from server 110 without having to repeatedly receive boot and upgrade information via network 108.

Management module 106 performs out-of-network management of server blade boot and upgrade routines, via step S206. As will be explained in greater detail below, module 106 alters the boot sequence for each server blade, and coordinates the transmission of boot and update instructions, which are stored in temporary boot server 110, to the requesting blade server in BLADECENTER® 102. Module 106 determines if each server blade in chassis 104 has been booted and has received the necessary upgrade, via step S208. If not, module 106 assures the remaining server blades are booted. After each server blade has been booted, module 106 restores each server blade's boot sequence to their initial settings and disables the VLAN 122 that had been created to allow communication between module 106 and server blades within BLADECENTER® 102, via step S210.

Figure 3A:
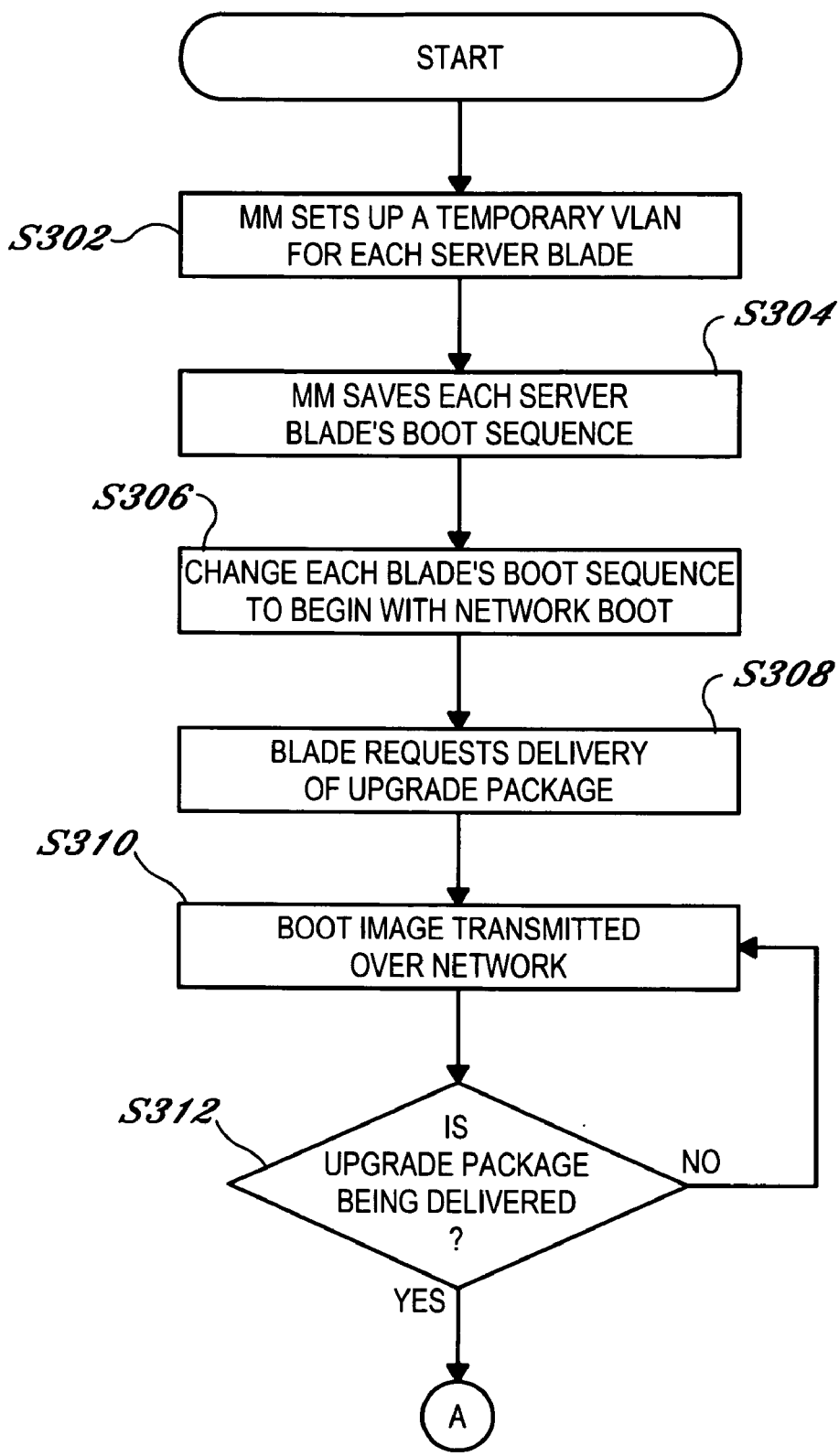
FIG. 3A is a flow chart illustrating the detailed process of upgrading each server blade and redirecting upgrade package to the remaining servers blades in the BLADECENTER®.
Figure 3B:
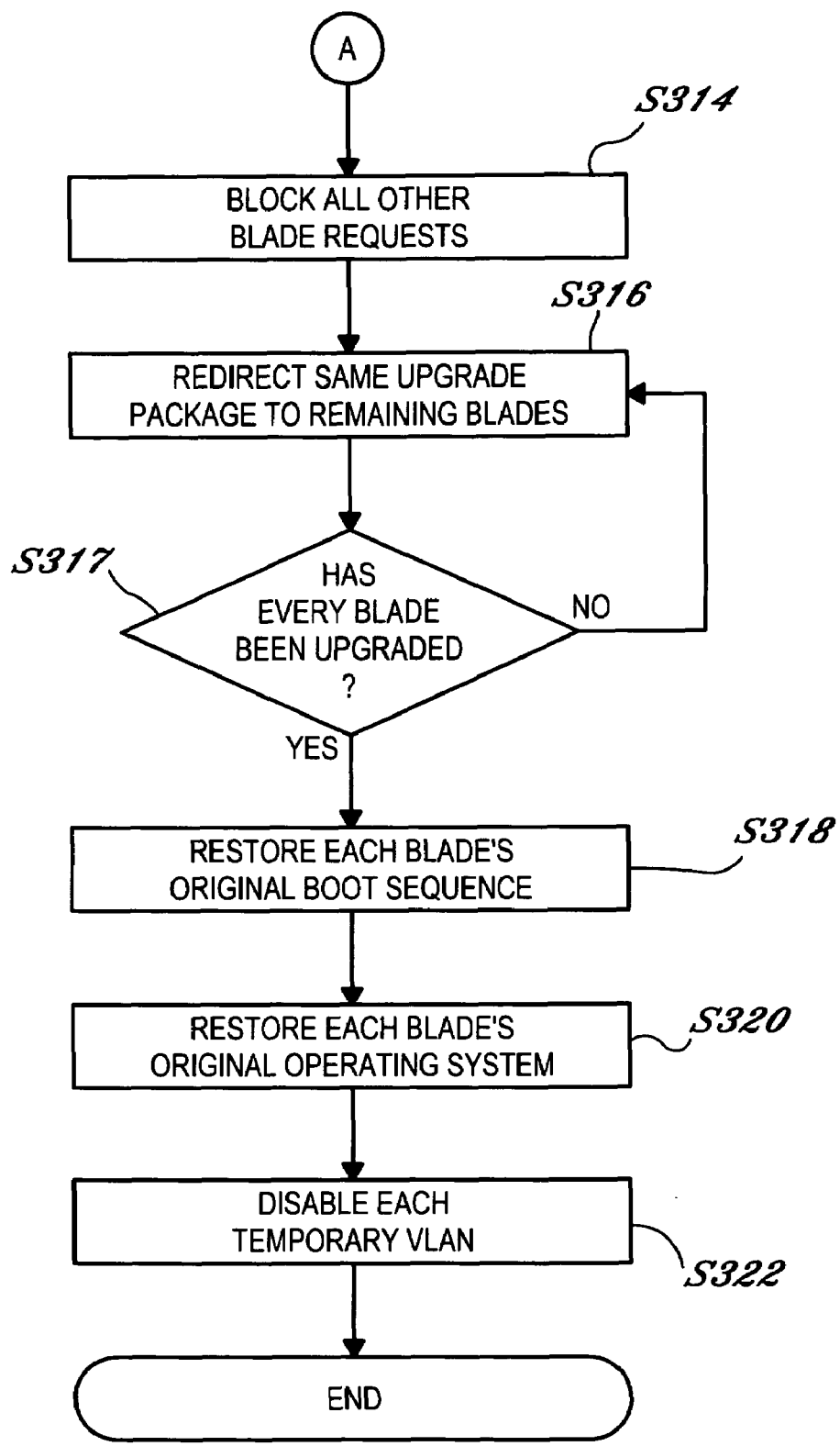
FIG. 3B is a continuation of the flow chart of FIG. 3A.

FIGS. 3A and 3B illustrate the detailed process taken by the present invention to seamlessly provide a system and method of booting server blades within a communication network while minimizing the burden on the network by shifting the management tasks to an out-of-band network local to the BLADECENTER® 102 that contains the server blades.

Via step S302, management module 106 creates a temporary VLAN 122 for each blade in BLADECENTER® 102. As discussed above, module 106 includes the hardware and software necessary to allow a remote server to communicate with the server blades of BLADECENTER® 102, and to control communication between the remote server and one or more of the server blades.

In a typical boot sequence for a network computer, the computer's hard drive is the default drive that contains the computer's operating system. While most computers follow a boot sequence whereby the computer's floppy drive and CD-ROM drive may also be searched for an operating system, the network itself is often searched last. After a temporary VLAN 122 has been created, module 106 receives and stores each server blade's boot sequence in memory, via step S304. Via step S306, module 106 then changes the BIOS boot sequence for each server blade in BLADECENTER® 102 so that each server blade first looks to network 108 for an operating system and boot instruction rather than its own hard drive.

When a server blade is powered on, it searches for an operating system and requests delivery of a boot package, containing the OS, through the network 108, via step S308, since its boot sequence has been altered to now look toward network 108 before looking in the server blade's own hard drive. Blade Center Update Utility 118 includes a CD-ROM boot image containing boot instructions, which are transmitted via network 108 to module 106, via step S310. Module 106 receives the boot packets and creates a temporary boot server 110 within VLAN 122 to store the boot image. Advantageously, this is the only time that the boot image and update packet need be transmitted over network 108.

Module 106 then determines, via step S312, if the boot image and upgrade packet has been transmitted from the remote server 110 and delivered to the requesting server blade. Once access to the boot image is confirmed, module 106 intercepts all other server blade boot requests from network 108, via step S314. The present invention advantageously limits the transmission of repeated boot instructions to each server blade over network 108, which could ultimately paralyze the network. Instead, the invention allows an initial transmission of boot packets containing the operating system and an upgrade package from network 108, and once delivery is confirmed (via step S312), intercepts all other blade requests for boot packets and re-routes boot packets to the remaining server blades since the initial boot packet transmission contains the necessary boot image for all other server blades or a designated group of server blades in BLADECENTER® 102.

Continuing to refer to FIG. 3B, module 106 then redirects the next boot request from a server blade away from network 108 and toward server 110 via VLAN 122 (step S316). Thus, step S316 allows module 106 to control the transmission of the same boot and upgrade packets 112 and 114 from temporary boot server 110 to the remaining server blades without the need to access the boot image from network 108.

In an embodiment of the present invention, once it has been determined that each server blade from BLADECENTER® 102 has been upgraded (via step S317), module 106 restores each blade's boot sequence back to its original state via step S318, since module 106 had previously saved each blade's original boot sequence in step S304. Module 106 may also reboot each server blade back to its operating system, via step S320. The VLAN 122 that had been created in order to share information within a network independent from communication network 108, may be disabled via step S322.

Although the present invention preferably utilizes a discrete Preboot Execution Environment (PXE) server in order to provide a remote site on a network that stores boot and upgrade images for each server blade, the invention is not limited to the use of a separate PXE server. In an alternate embodiment, the temporary boot server resides in the management module 106. In this embodiment, a CD image within module 106 contains the boot instructions, operating system and upgrade packets. Thus, referring to step S316 in FIG. 3B, instead of module 106 instructing the delivery of boot and upgrade packets from boot server 110, module 106 directs the server blades to the boot image stored within module 106.

It is contemplated that the above-described method can be implemented without the need for repeated administrator intervention. Although a sequence of setup steps (i.e., creation of VLAN 122, storing of each blade's boot sequence) and restoration steps (i.e. restoring each blade's boot sequence and disabling of the VLAN 122) are needed to implement the present invention, there is no longer a need for a network administrator to memorize and enter USERIDs and passwords upon each server blade boot request. The creation of a second, discrete communication network (VLAN 122) local only to chassis 104, its components contained therein, and proxy server 110, removes the need to access the boot image over IP network 108 for every server blade.

It is further contemplated that management module 106 is located within VLAN 122 but need not physically reside within chassis 104 or near BLADECENTER® 102. Module 106 may be located virtually anywhere provided it communicates with temporary server 110 and BLADECENTER® 102 via VLAN 122 and, other than receiving the initial boot image from IP network 108, does not take part in further communication over IP network 108.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for remotely booting a plurality of server blades in a first computer network, the system comprising:
    a management module adapted to receive server blade boot packets via the first computer network, the management module in communication with the one or more server blades within a second computer network; and
    a temporary boot server coupled to the management module and the one or more server blades within the second computer network, the temporary boot server adapted to store the boot packets,
    wherein the management module controls transmission of the boot packets from the temporary boot server to the plurality of server blades via the second computer network.

2. The system of claim 1, wherein the plurality of server blades reside within a chassis.

3. The system of claim 1, wherein a boot image located within the management module boots the server blades.

4. The system of claim 1, wherein the second computer network is a virtual local area network.

5. The system of claim 1, wherein the management module, upon confirmation of the transmission of an initial boot packet to a requesting server blade, intercepts additional requests for boot packets and re-routes boot packets to the remaining server blades.

6. The system of claim 1, wherein the management module receives each server blade's boot sequence via the second computer network.

7. The system of claim 6, wherein the management module changes the boot sequence for each of the plurality of server blades whereby each server blade's boot sequence begins with a network boot.

8. The system of claim 7, wherein the management module restores the boot sequence for each of the plurality of server blades to their original boot sequence.

9. The system of claim 1, further comprising a switch that activates the second computer network.

10. A method for remotely booting a plurality of server blades in a first computer network, the method comprising:
    establishing a second computer network between a management module and the plurality of server blades;
    altering the boot sequence for each server blade such that each server blade begins with a network boot;
    creating a temporary boot server to store boot packets; and
    upon a server blade request for a boot packet, transmitting the boot packets from the temporary boot server to each of the plurality of server blades within the second computer network.

11. The method of claim 10, further comprising activating the second computer network via a switch.

12. The method of claim 10, wherein the second computer network is a virtual local area network.

13. The method of claim 10, wherein upon confirmation of the transmission of an initial boot packet to the requesting server blade, further comprising intercepting additional requests for boot packets from the remaining server blades and re-routing boot packets to the remaining server blades.

14. The method of claim 10, further comprising restoring the boot sequence for each of the plurality of server blades to their original boot sequence.

15. The method of claim 10, wherein a boot image located within the management module boots the server blades.

16. A machine readable storage device having stored thereon a computer program for remotely booting a plurality of server blades in a first computer network, the computer program comprising a set of instructions which when executed by a machine causes the machine to perform a method including:
    establishing a second computer network between a management module and the plurality of server blades;
    altering the boot sequence for each server blade such that each server blade begins with a network boot;
    creating a temporary boot server to store boot packets; and
    upon a server blade request for a boot packet, transmitting the boot packets from the temporary boot server to each of the plurality of server blades within the second computer network.

17. The method of claim 16, further comprising activating the second computer network via a switch.

18. The method of claim 16, wherein the second computer network is a virtual local area network.

19. The method of claim 16, wherein upon confirmation of the transmission of an initial boot packet to the requesting server blade, further comprising intercepting additional requests for boot packets from the remaining server blades and re-routing boot packets to the remaining server blades.

20. The method of claim 16, further comprising restoring the boot sequence for each of the plurality of server blades to their original boot sequence.

* * * * *